W. A. KELLY.
TIRE VALVE.
APPLICATION FILED MAR. 29, 1916.
1,223,179.
Patented Apr. 17, 1917.
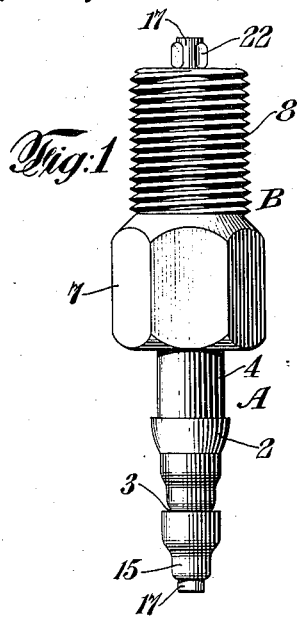
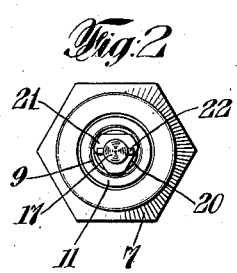
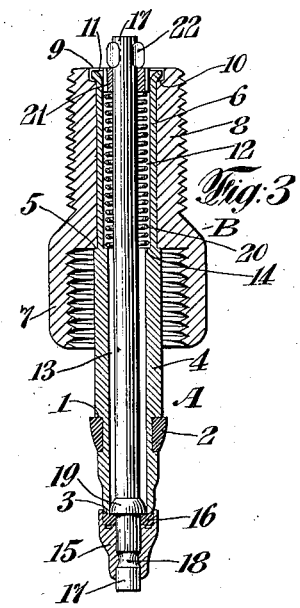
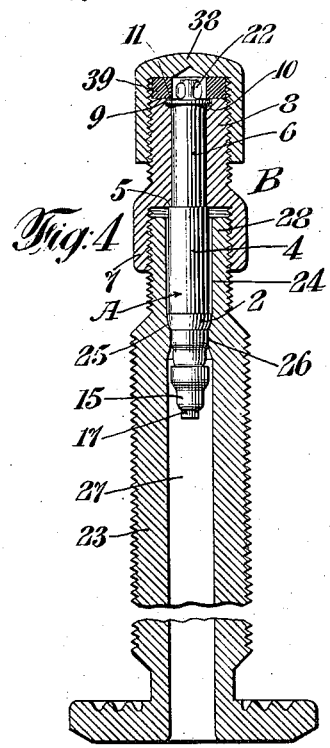
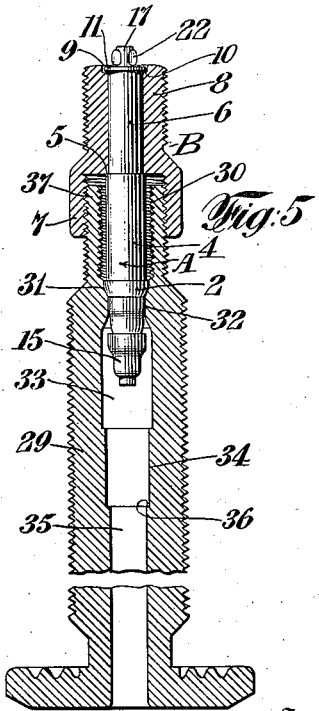
Inventor
William Ashley Kelly
By his Attorney
Harry D. Williams

UNITED STATES PATENT OFFICE.

WILLIAM ASHLEY KELLY, OF NEW YORK, N. Y., ASSIGNOR TO ALBERT B. NORWALK, OF NEW YORK, N. Y.

TIRE-VALVE.

1,223,179.   Specification of Letters Patent.   Patented Apr. 17, 1917.

Application filed March 29, 1916. Serial No. 87,418.

*To all whom it may concern:*

Be it known that I, WILLIAM ASHLEY KELLY, a citizen of the United States, residing in the borough of the Bronx, in the county of the Bronx and State of New York, have invented certain new and useful Improvements in Tire-Valves, of which the following is a specification, reference being had therein to the accompanying drawings, forming part thereof.

My invention relates to tire valves and is related to and may be considered as a modification of the construction disclosed in the application for patent of Albert B. Norwalk, for tire valves, filed March 21, 1916, Serial No. 85,543. Objects of my invention are adaptation to the usual or standard form of tire tube and also to a simpler form of tire tube, convenience in inserting and removing the tire valve, strength and simplicity of construction, inexpensiveness of manufacture, secure sealing against leakage, reliability, durability, the housing and protection of the more delicate parts from damage, and other objects and advantages which will hereinafter appear.

My invention includes a tubular nut member having internal screw-threads engageable with the external screw-threads at the outer end of a tire tube and having also at its outer end a projecting externally screw-threaded extension engageable by a usual dust cap or by the usual tire pump connection, and a non-rotative tubular sealing member for forming a seal within the bore of the tire tube and joined by a swivel connection to the tubular nut member or swivel nut, and more particularly such tubular sealing member having at its outer end a long bearing sleeve at the outside of the tire tube and upon which the rotative swivel nut is journaled throughout the length of its projecting externally screw-threaded extension. My invention also includes other features of construction and combinations of parts, as will appear from the following description.

I shall now describe the tire valve construction embodying my invention illustrated in the accompanying drawings and shall thereafter point out my invention in claims.

Figure 1 is an elevation; Fig. 2 a plan view; and Fig. 3 a central longitudinal section of a tire valve embodying my invention.

Fig. 4 is a reduced central longitudinal section of a tire tube of a simple form of construction with which the tire valve of my invention is shown as combined and parts of which appear in elevation.

Fig. 5 is a similar view illustrating the tire valve of my invention as combined with a heretofore commonly used tire tube of more complicated construction and having special features of construction for combination with a heretofore employed different tire valve structure requiring these special features in the tire tube.

The tire valve embodying my invention illustrated in the accompanying drawings comprises a non-rotative tubular sealing member A, and a rotative screw-threaded tubular nut member B swiveled to the sealing member A, these members A and B having features of construction coöperative with one another and with a tire tube, as will now be described.

The non-rotative tubular sealing member A has provided therein outwardly from its lower end, as shown, an annular groove 1 for the reception of a packing ring 2 of suitable material, such as soft rubber, this packing ring 2 being tapered, as shown, so as to form a tight stopper-like seal within the bore of a tire tube, as will hereinafter appear. Below or inward from the sealing ring 2 the inner end of the tubular sealing member A is reduced and tapered as shown to form a valve seat 3 for an inwardly opening check valve of suitable construction carried by the sealing member or valve tube A, as will presently appear. Above or outward from the annular groove 1 for the sealing ring 2 the tubular sealing member A is extended outward or upward to form a smooth cylindrical middle part or body 4 which is adapted to extend to the outside of and slightly beyond the end of the tire tube. Beyond the body 4 the tubular sealing member A is slightly reduced in diameter to provide a small shoulder 5 and a long cylindrical bearing sleeve 6 at the outer end of the tubular sealing member A and which is adapted to project at the outer end of the tire tube.

The rotative tubular nut member B has at its lower end a skirt 7 which is shown as outwardly hexagonal for the accommodation of either the fingers or a tool, and which is inwardly screw-threaded for screwing over the outwardly screw-threaded outer end of the tire tube. At its outer end the nut member B has a reduced tubular extension 8, which provides a long bearing by which the nut member B is rotatively mounted upon the bearing sleeve 6, and which is outwardly screw-threaded for the reception of a usual dust cap such as has been commonly employed on tire tubes, or for the connection thereto of a usual tire pump, the outer and inner screw-threads of the nut member B being complementary to each other, the external screw-threads of the reduced outer end 8 of the nut member B being adapted to replace the usual external screw-threads of the end of the tire tube so that the nut end 8 forms a substitute screw-threaded end for the tire tube.

At the shoulder formed within the skirt 7 the nut member B abuts against the shoulder 5 of the non-rotative tubular sealing member A, as shown in the drawings, particularly in Fig. 3. At its outer end, or at the termination of the reduced extension 8, the tubular nut member B has its bore enlarged at 9 for a short distance inward to provide a shoulder 10, over which the outer end of the bearing sleeve 6 is turned or upset to provide a retaining flange 11 which, together with the shoulder 5, prevents relative longitudinal or endwise movements of the swiveled parts A and B, excepting as to slight play for preventing binding. It will be noted that the nut member B and the tubular sealing member A are irremovably or inseparably swiveled together, so that the sealing member A partakes of the inward and outward longitudinal movements of the nut member B without rotation of the sealing member. It is also to be noted that the bearing sleeve 6 of the tubular sealing member A is of much greater length than diameter and that it traverses or extends through from the inside to the outer end of the tubular plug member B, thereby forming a very long swivel bearing which prevents longitudinal angular movements between the parts A and B while permitting free axial or rotative swiveling movement of these parts.

The non-rotative tubular sealing member A, provided at its inner end, as hereinbefore described, with the valve seat 3, forms a valve-carrying valve tube for the tire valve construction of my invention. The sealing member or valve tube A has a longitudinal bore or passage which has an outer portion 12 of larger diameter and an inner portion 13 of reduced diameter which extends through to the inner end, terminating in the valve seat 3, an inner shoulder 14 being formed in the bore, such inner shoulder 14 being shown as located opposite to or in the same transverse plane as the outer shoulder 5.

The inwardly opening check valve which is coöperative with the valve seat 3, comprises a cup-shaped valve head 15 which is provided with or contains a rubber sealing disk 16 which directly coöperates with the terminal valve seat 3. The valve head 15 and its rubber sealing disk 16 are carried by a valve pin 17, the inner end of which passes through the sealing disk 16 and the valve head 15, and the valve pin or valve stem 17 is shown as provided with an annular groove 18 into which a tapered lower portion of the valve head 15 is pressed or swaged, as appears in Fig. 3, thereby providing a strong construction. Just outward from the rubber sealing disk 16 the valve pin 17 is provided with an outwardly tapered enlargement 19, which forms a shoulder holding the rubber sealing disk 16 in place and also forms a guide in the reduced bore 13 to assure the proper seating of the valve upon the valve seat 3. A coiled compression spring 20 assists the air pressure in closing the valve and surrounds the valve pin 17 within the bore 12 of the bearing sleeve 6 and acts between the internal shoulder 14 and a small triangular stop plate 21 on the outer end of the valve pin 17, this plate 21 being held in place by abutments 22 formed by pinching the valve pin 17 adjacent to its outer end, as appears in the drawings. The valve pin 17 projects a short distance beyond the outer ends of the members A and B, thereby providing for the pushing in of the valve pin 17 to unseat the valve for deflating the tire or for testing by means of the usual tire gage.

The two different tire tubes illustrated in the drawings, with which the tire valve construction of my invention is equally coöperative, will now be described. In Fig. 4 there is illustrated a comparatively simple and inexpensive form of tire tube 23. At its outer end the tire tube 23 is provided with a smooth outer bore 24 inward from which is an inwardly tapered or outwardly flaring sealing surface or seat 25 followed by a reduced bore 26 of comparatively short length, inward from which the bore is slightly enlarged at 27 and thus continues, as shown in the drawings, throughout to the inner end or base of the tire tube 23. Excepting as to its internal construction, just described, the tire tube 23 is of a usual construction, and is provided with a usual outer reduced outwardly screw-threaded end 28.

A standard form of tire tube 29, heretofore extensively employed, is illustrated in Fig. 5. The two different tire tubes 23 and 29 are of similar outer or external construction. The standard tire tube 29 is provided at its outer end with a screw-threaded socket 30. Inward from the socket 30 is a tapered sealing surface 31, and a short reduced bore 32 which is followed by a slightly enlarged bore 33, respectively similar to the tapered sealing surface 25, reduced bore 26 and enlarged bore 27 of the hereinbefore described tire tube 23. In the standard tire tube 29 the bore is again reduced at 34, and inward from the reduced bore 34 the bore is again further reduced at 35 to form a shoulder 36, from which the small bore 35 continues inward to the base or inner end of the tire tube 29. The standard tire tube 29 has the usual reduced outwardly screw-threaded outer end 37, corresponding to the similarly screw-threaded reduced outer end 28 of the first described tire tube 23.

The tire valve construction of my invention illustrated in the drawings and hereinbefore described, enters into like combination with similar features of construction of either the standard form of tire tube 29 or the simpler form of tire tube 23. Referring first to Fig. 4, illustrating the simpler tire tube 23, the tubular nut member B may be conveniently rotated to screw the internally screw-threaded skirt 7 over the externally screw-threaded end 28 of the tire tube 23 and thereby, without rotation of the tubular sealing member A or the sealing ring 2, gradually to force the tapered stopper-like sealing ring 2 into a tight and secure sealing relation with the correspondingly outwardly flaring sealing surface 25 of the valve tube 23, and also at the same time the sealing ring 2 is forced into a close sealing relation with the valve tube or tubular sealing member A. The pressing in of the sealing member A without rotation preserves the rubber sealing ring 2 in good sealing condition, as is well understood in the art. It is to be noted that the length of the body 4 of the sealing member B is sufficient that the nut member remains spaced from and does not seat upon the outer end 28 of the tire tube 23, thereby assuring a secure seal at the ring 2. It is also to be noted that the relative proportions of the parts are such that the valve seat 3 of the non-rotative tubular sealing member or valve tube A and the valve head 15 come within the bore enlargement 27 of the tire tube 23, so that free space is provided for the passage of air around the valve head 15. A simple and inexpensive dust cap 38 screws over the outer end 8 of the tubular nut member B and has therein a simple annular gasket 39 which forms an outer seal with the outer surface of the end 8 of the nut member B. The outer reduced screw-threaded end 8 of the nut member B provides also for the attachment of the usual tire pump connection which heretofore commonly has been attached to the end of the tire tube.

The long bearing formed by the sleeve 6 of the valve tube A, by preventing angular movements longitudinally of the parts A and B, assures a direct and secure seating of the sealing ring 2 within the tapered sealing surface 25. Furthermore, this extended sleeve 6 provides for the secure housing and protection of the valve spring 20 which thereby is not exposed to injury in shipment or in packing, as are the exposed springs in the hereinbefore mentioned complicated valve structure heretofore commonly employed in connection with the tire tube 29.

An important advantage of the tire valve of my invention is that it is adapted to be employed upon and coöperate with the usual or standard form of tire tube 29 shown in Fig. 5. When the improved tire valve construction of my invention is applied to the usual or standard form of tire tube 29, as illustrated in Fig. 5, the valve seat 3 and valve head 15 come within the bore enlargement 33, and the tapered stopper-like rubber sealing ring 2 on the non-rotative tubular sealing member or valve tube A is pressed, without rotation, into the flaring sealing surface 31 by the engagement of the internal screw-threads of the skirt 7 of the tubular swivel nut B with the external screw-threads of the outer reduced end 37 of the tire tube 29, without the nut member of the tire tube 29 coming into contact with the end surface of the reduced end 37 of the tire tube 29, the operation being substantially the same as was described in reference to the simplified tire tube 23 illustrated in Fig. 4, it being noted that a tight seal is produced merely by screwing the tubular nut member B into place, and also when desired the tire valve may be similarly removed from the tire tube 29. When my improved tire valve construction is employed in the standard tire tube 29, the screw-threaded end socket 30, and the two inner reduced bores 34 and 35, together with the shoulder 36 formed between them, do not perform any function, these additional features of construction in the tire tube being unnecessary for the employment of my improved tire valve, but all being required for the different complicated valve construction hereinbefore mentioned as heretofore commonly employed with the tire tube 29. The outer reduced outwardly screw-threaded end 8 of the tubular nut member or swivel nut B is adapted to receive a usual screw-threaded dust cap such as heretofore has been employed upon the outer end 37 of the tire tube 29, and such outer dust cap preferably is the simple form of dust cap 38 illustrated in Fig. 4. Also the usual tire pump connection, which heretofore has been attached to the end 37 of the tire tube 29, may now be similarly attached to the screw-threaded end 8 of the nut member B.

The improved tire valve construction of my invention, as illustrated in Figs. 1, 2 and 3 of the drawings, may constitute a separate and distinct article of manufacture and sale, or it may be manufactured and sold in combination with either of the two different tire tubes illustrated respectively in Figs. 4 and 5 of the drawings. While it is to be noted as particularly advantageous that the tire valve of my invention is fully coöperative with the standard form of tire tube 29, it is also to be noted that several features of this tire tube may be omitted and its construction correspondingly simplified when a tire tube, such as the tire tube 23, is made particularly for coöperation with my tire valve.

It is obvious that various modifications may be made in the construction shown in the drawings and above particularly described within the principle and scope of my invention.

I claim:

1. A tire valve construction including a tubular nut member having at its inner end internal screw-threads and having its outer end reduced and provided with external screw-threads which are the complement of said internal screw-threads, a tubular sealing member having at its outer end a long bearing sleeve passing through and substantially coterminous with the tubular nut member and forming an inseparable swivel connection with the outer reduced end portion of the tubular nut member and preventing longitudinal angular movement of said tubular members, whereby the internal screw-threads of the tubular nut member are adapted to engage the externally screw-threaded end of a tire tube and the tubular sealing member is adapted to form a seal with the tire tube without rotation relatively thereto, the external screw-threads of the tubular nut member being adapted to form a substitute screw-threaded end of the tire tube, the sealing member being provided with a valve seat, and a check valve carried by the sealing member and coöperative with the valve seat.

2. A tire valve construction including a tubular nut member having at its inner end internal screw-threads engageable with the external screw-threads of the end of a tire tube and having its outer end reduced and provided with external screw-threads similar to the end of the tire tube and complementary to said internal screw-threads, said external screw-threads of the nut member being adapted to take the place of the external screw-threads of the tire tube, a tubular sealing member adapted to form a seal within the bore of the tire tube and having at its outer end a long bearing sleeve passing through and substantially coterminous with the tubular reduced outer end portion of the nut member and forming an inseparable swivel connection with the tubular nut member, the sealing member being provided with a valve seat, and a check valve carried by the sealing member and coöperative with the valve seat.

3. A tire valve construction comprising a tubular nut member having at its inner end internal screw-threads engageable with the external screw-threads of the end of a tire tube and having its outer end reduced and provided with external screw-threads complemental of said internal screw-threads and similar to and adapted to take the place of the external screw-threads of the end of the tire tube, a tubular sealing member having at its outer end a bearing sleeve of greater length than diameter passing through the tubular nut member and provided at its outer end with a flange for forming an inseparable swivel connection with the tubular nut member, the sealing member being provided with a valve seat, a check valve carried by the sealing member and coöperative with the valve seat, and a ring of packing material on the sealing member for forming a seal within the bore of the tire tube.

4. A tire valve construction comprising a tubular nut member having at its inner end internal screw-threads engageable with the external screw-threads of the end of a tire tube and having its outer end reduced and provided with external screw-threads complemental of said internal screw-threads and similar to and adapted to take the place of the external screw-threads of the end of the tire tube, a tubular sealing member having at its outer end a bearing sleeve of greater length than diameter passing through the tubular nut member and provided at its outer end with a flange for forming an inseparable swivel connection with the tubular nut member, the sealing member being provided with a valve seat, a check valve carried by the sealing member and coöperative with the valve seat, a valve-closing spring contained within the bearing sleeve of the tubular sealing member, and a ring of packing material on the sealing member for forming a seal within the bore of the tire tube.

5. A tire valve construction comprising, in combination with a tire tube attachable to the tire and having its outer end externally screw-threaded and having a sealing surface within its bore inward from the outer end, a tubular nut member internally screw-threaded at its inner end for screwing over the end of the tire tube and having a projecting outer reduced end portion provided with external screw-threads complemental to the internal screw-threads and adapted to take the place of the external screw-threads of the end of the tire tube, a tubular sealing member having at its outer end a bearing sleeve passing outward through and substantially coterminous with the tubular nut member and forming an inseparable swivel connection therewith, the sealing member being provided with a valve seat, a ring of packing material on the sealing member for forming a seal with the sealing surface of the tire tube, and a check valve coöperative with the valve seat.

6. A tire valve construction comprising, in combination with a tire tube attachable to the tire and having its outer end externally screw-threaded and having a sealing surface within its bore inward from the outer end, a tubular nut member internally screw-threaded at its inner end for screwing over the end of the tire tube and having a projecting outer reduced end portion provided with external screw-threads complemental to the internal screw-threads and adapted to take the place of the external screw-threads of the end of the tire tube, a tubular sealing member having at its outer end a bearing sleeve passing outward through and substantially coterminous with the tubular nut member and forming an inseparable swivel connection therewith, the sealing member being provided with a valve seat, a ring of packing material on the sealing member for forming a seal with the sealing surface of the tire tube, a check valve coöperative with the valve seat, and a screw-threaded end cap engageable with the external screw-threads of the tubular nut member.

In testimony whereof I have affixed my signature.

WILLIAM ASHLEY KELLY.